Patented June 6, 1950

2,510,426

UNITED STATES PATENT OFFICE 2,510,426

POLYMERIZATION OF MONOMERIC MIXTURES COMPRISING A CHLOROETHYLENE AND ANOTHER COPOLYMERIZABLE UNSATURATED COMPOUND IN AQUEOUS MEDIUM IN THE PRESENCE OF AN IONIZABLE SILVER COMPOUND

Grant W. Smith, Grand Forks, N. Dak., assignor to The B. F. Goodrich Company, New York, N. Y., a corporation of New York No Drawing. Application October 11, 1947, Serial No. 779,414

3 Claims. (Cl. 260—86.3)

This invention relates to the polymerization in aqueous medium of monomeric mixtures comprising a chloroethylene having one to two chlorine atoms on one only of the carbon atoms and another copolymerizable unsaturated compound, and more particularly to the use in such polymerization of an activator comprising an ionizable silver compound.

It is well known that such chloroethylenes can be polymerized in an aqueous medium in the presence of catalysts, activators, emulsifiers, buffers, modifiers, and the like. However, many of the known methods of polymerization involving the presence of the conventional "per" compounds as catalysts such as benzoyl peroxide, potassium persulfate, caprylyl peroxide, the percarbonates, perborates, perphosphates, and others, suffer from the disadvantage that the reaction does not start immediately but rather exhibits an "induction period" or period of inhibition during which time the factors favoring polymerization are not present or during which time certain chemical and physical changes are going on, the build-up of which later results in polymerization. The above-described "induction period" is undesirable because it greatly lengthens the time to completion of the polymerization reaction and thereby reduces equipment capacity. Moreover, the induction period makes impracticable the polymerization of monomeric material in a continuous manner. It is known that the induction period may be reduced by increasing the catalyst concentration and/or by carrying out polymerization at higher than normal temperatures. However, increasing the concentration of conventional "per" compounds or increasing the reaction temperature results in polymers of lower molecular weight which are undesirable for commercial utilization.

I have now discovered that the polymerization of monomeric mixtures comprising such a chloroethylene and another copolymerizable monomeric material may be polymerized in a rapid manner and in a shorter total reaction time by carrying out the polymerization in an aqueous medium in the presence of small amounts of a polymerization catalyst comprising a peroxygen compound, preferably a water-soluble persulfate, and in the additional presence of small amounts of a polymerization activator comprising an ionizable silver compound such as silver nitrate, silver acetate and the like, or in the presence of metallic silver itself when a solubilizing agent such as potassium or sodium persulfate or sulfuric acid is present. By the use of the silver activator, the induction period in the polymerization of such monomeric mixtures may be reduced by 50 or 75% or more, or entirely eliminated. When using this activator, the reaction temperature is not critical and may vary widely from as low as 10° C. or lower to as high as 100° C. or higher, though generally polymerization of the preferred monomeric materials according to this invention is effected at 20 to 60° C.

The amount of peroxygen catalyst necessary in order to obtain rapid polymerization in the method of this invention is likewise not critical but may vary from 0.1% to 0.5% or 1% or even as high as 5% (based on the monomers) but, generally, the use of 0.2 to 0.7% of a water-soluble persulfate such as ammonium, sodium or potassium persulfate is preferred. Other well known peroxygen compounds such as hydrogen peroxide, benzoyl peroxide, alkali metal perborates, and percarbonates and the like, may be substituted for the persulfates but the persulfates give far better results and are greatly preferred.

The speed of the polymerization reaction varies in accordance with the amount of ionizable silver compound added to the reaction mixture but the rate of polymerization increases with an increase in added silver salt. For example, as little as 0.0005% of silver nitrate (on the water phase will produce a definite accelerating effect on the copolymerization of a mixture containing 90% by weight of vinyl chloride and 10% by weight of ethyl acrylate, and the accelerating effect rapidly increases as the amount of silver nitrate is increased to 0.02% but the effect decreases with higher silver nitrate concentrations. Similar results are shown in the polymerization of other monomers and, as a general rule, concentrations of 0.01 to 0.10% silver nitrate on the water phase will be found to produce fastest reaction but amounts varying from 0.0005 to 0.5% may be used to advantage.

The above concentrations are based on the addition of silver nitrate to the aqueous medium either before or after addition of the material to be polymerized. This, however, is not the only method of adding silver ion to the reaction mixture since such ions are formed by adding other water-soluble or sparingly soluble silver compounds such as silver sulfate, silver acetate, silver nitrate, silver chlorate or silver lactate to the reaction mixture together with the preferred potassium, sodium or ammonium persulfate catalyst and the sparingly soluble silver compound will dissolve in the persulfate solution with the formation of silver ion. In addition, the silver solution may be formed outside the reaction medium and added as such thereto, for example, by dissolving silver chloride in sodium persulfate solution and adding the sodium persulfate silver chloride solution to the reaction mixture. In any event whichever method of introducing silver ion is adopted it has been found that the nature of the anion is not critical for the silver ion has been found to be the active agent. In all these alternative methods, the concentration of silver which should be used is that which is chemically equivalent to the amounts of silver nitrate set forth above.

Polymerization of monomeric material according to the method of this invention may be performed in an aqueous medium in the presence of an efficient emulsifying agent so as to obtain the polymer in the form of a latex or dispersion. Examples of emulsifying agents which may be used include the fatty acid soaps such as sodium oleate, potassium palmitate, sodium stearate, sodium myristate and the like; and the synthetic saponaceous materials such as the hymolal sulfates and alkaryl sulfonates including, for example, sodium lauryl sulfate, sodium isopropyl naphthalene sulfonate, and the sodium salts of alkyl naphthalene or benzene sulfonic acids; the sodium salt of N-octadecyl, N-1,2-decarboxyethyl sulfosuccinamate, and others. Gelatin, fine bentonite clay, and other colloidal protective materials may also be used. The nature of the emulsifying agent is not critical for in any case stable dispersions of polymer are obtained by the use of the silver activator of this invention in an aqueous medium in the presence of an emulsifying agent.

Alternatively, polymerization of the monomeric material in the presence of the silver activator of this invention may be effected in an aqueous medium in the absence of any added emulsifying agent. In the absence of an emulsifier, polymerization proceeds smoothly and rapidly to high yields and the polymer is usually obtained in a fine granular condition which facilitates separation of the polymer from the aqueous phase.

In either event (whether emulsifier is present or absent), it is preferred that the amount of water present be 1 to 5 times that of the monomeric material and that the reaction mixture be agitated constantly during the time that polymerization is taking place so as to insure efficient distribution of the monomers.

The polymerization is preferably carried out in the absence of gaseous or molecular oxygen for it has been observed that the presence of even a small amount of molecular oxygen will cause an appreciable "induction period" or lag in the commencement of polymerization. Accordingly, it is preferred that the monomeric materials be freshly distilled shortly before use or stored under an inert atmosphere such as nitrogen before charging the reaction mixture. If polymerization is effected continuously in a "pipe line," appropriate precautions are preferably taken to exclude oxygen from the reaction mixture.

The new catalyst-activator combination of this invention may be employed in conjunction with various other polymerization expedients. For example, buffer salts such as sodium bicarbonate may be added to the reaction mixture. As other expedients, the entire mixture of monomers is not added to the reaction mixture but is added in increments or at a uniform rate over the entire reaction period or one or more of the more readily polymerizable monomers is added in increments or at a uniform rate over the reaction period. Moreover, the catalyst and silver activator may be added gradually or in increments during the progress of the polymerization. Addition of the silver activator in a gradual manner may be effected by coating the added silver or silver compound with collodion or depositing it on silica gel so as to permit gradual diffusion of silver during the course of the reaction.

The method of this invention is applicable generally to the polymerization of monomeric mixtures comprising a chloroethylene containing from one to two chlorine atoms on one only of the carbon atoms, that is, vinyl chloride or vinylidene chloride together with one or more other unsaturated monomeric materials. The monomeric materials which are preferred for copolymerization in the presence of the activator of this invention with vinyl chloride or vinylidene chloride are the unsaturated materials containing the $CH_2=C<$ group, that is, compounds containing a terminal methylene group attached by a double bond to a carbon atom. Examples of such comonomers include, in addition to vinyl chloride and vinylidene chloride, the alkyl acrylates (which are preferred) including methyl, ethyl, propyl, butyl and octyl acrylates and others, and also other compounds such as styrene, p-chlorostyrene, 3,5-dichlorostyrene, p-methoxy styrene, acrylonitrile, methacrylonitrile, alpha-chloro acrylonitrile, vinyl bromide, vinyl fluoride, vinyl iodide, vinyl acetate, vinyl propionate, vinyl butyrate, vinyl benzoate, vinylidene bromide, vinylidene chlorofluoride, methyl methacrylate, butyl ethacrylate, methacrylamide, vinyl methyl ketone, vinyl pyridine, vinyl carbazole, vinyl methyl ether, isobutylene, ethylene, and other similar monoolefinic polymerizable compounds. Other unsaturated compounds containing more than one unsaturated linkage which may be copolymerized with the chloroethylenes in the presence of the silver activator include the conjugated dienes such as butadiene-1,3, isoprene, and the other butadiene-1,3 hydrocarbons, chloroprene, and 3-cyano butadiene-1,3, as well as trienes such as myrcene and compounds containing olefinic and acetylenic bonds such as vinyl acetylene, vinyl ethynyl diethyl carbinol and the like. The chloroethylenes may be copolymerized with one or more of the above-mentioned compounds or with still other unsaturated polymerizable materials such as diethyl maleate, diethyl fumarate, maleic acid or anhydride or the like.

The invention will be further described by the following specific examples which are intended to be merely illustrative of the invention and not a limitation thereon.

*Example I*

To show the effect of the new silver activator of this invention, polymerization of a mixture of vinyl chloride and ethyl acrylate was performed by sealing the reaction mixture in glass tubes under a nitrogen atmosphere and placing the tubes in a rotating rack within a constant temperature water bath maintained at 45° C. The reaction mixture was in the following proportions, in which parts are by weight:

| | |
|---|---:|
| Vinyl chloride | 90 |
| Ethyl acrylate | 10 |
| Potassium persulfate | 0.5 |
| Emulsifier [1] | 4.0 |
| Water | 196.0 |

[1] Sodium salt of n-octadecyl-N-1,2-dicarboxyethyl sulfosuccinamate.

In a tube containing the above ingredients and in addition 0.1% sulfuric acid, but no silver nitrate, reaction did not start until after 7 hours in the water bath and yielded only 64% in 24½ hours of reaction. But a tube containing only 0.005% of silver nitrate in addition to 0.1% sulfuric acid on the aqueous phase showed the reaction was 50% complete within 5¼ hours after being placed in the bath and a yield of 100% was obtained within 24½ hours. It is to be noted that the presence of only .005% silver nitrate based on the aqueous phase reduced the induction period from more than 7 hours to much less than 5 hours and increased the yield in the same total reaction time by almost 40%.

Example II

The silver ion activator of this invention may be added to the reaction mixture, as pointed out heretofore, by depositing an insoluble silver compound such as silver chloride on silica gel. An illustrative manner of depositing silver chloride on a silica gel carrier consists of treating a solution containing 0.2 M $AgNO_3$ solution with hydrochloric acid to precipitate silver chloride, then dissolving the silver chloride in a considerable excess of concentrated $NH_4OH$ to form $Ag(NH_3)_2Cl$. The solution is diluted to 200 ml. (i. e. to form 200 ml. of 0.2 M $Ag(NH_3)_2Cl$) and then poured over 50 gms. of finely granular silica gel. After standing in contact with the $Ag(NH_3)_2Cl$ solution for a time to permit the gel to become saturated, the excess solution is poured off and the silica gel heated to 150° C. for 40 min. to drive off water. The dried gel was heated in a lead bath at 320–350° C. for 1 hour in a current of hydrogen gas to drive off ammonia. The silica gel was found to have turned jet black. The resulting gel was found to contain 0.114 gms. silver/gm. of gel (as AgCl).

The above-described silver chloride containing silica gel was used as a polymerization activator in the polymerization, conducted at 40° C. in the same manner as that described in Example I, of the following mixture of materials, in which parts are by weight:

| | |
|---|---:|
| Vinyl chloride _____gm__ | 3.6 |
| Ethyl acrylate | 0.4 |
| Potassium persulfate | 0.02 |
| Emulsifier [1] | 0.16 |
| Sulfuric acid | 0.008 |
| Activator—silver chloride on silica gel | 0.013 gm. silver as silver chloride |
| Water | 6.00 |

[1] Same as Example I.

A sample containing the above materials polymerized smoothly to a yield of 92% in 23 hours and 50 minutes. It is seen that silver chloride can be used in place of the preferred silver nitrate.

Example III

The new silver activator of this invention is also effective in the polymerization of mixtures of chloroethylenes and monomers containing more than one carbon to carbon unsaturated linkage. Mixtures of vinylidine chloride and butadiene-1,3 were prepared in the following proportions, in which parts are by weight:

| | |
|---|---:|
| Vinylidene chloride | 50 |
| Butadiene-1,3 | 50 |
| Potassium persulfate | 0.5 |
| Fatty acid soap flakes (7.5% acidified with $H_2SO_4$) | 4.0 |
| Water | 196.0 |
| Silver nitrate | Variable |

The polymerization was effected in glass polymerization tubes as described in the foregoing examples at a temperature of 45° C. A sample containing the above materials except that it contained no silver nitrate did not exhibit any appreciable reaction until more than 23 hours had elapsed and the polymerization resulted in only 47.5% yield in 125 hours. A further sample of the same concentration but containing only 0.008% silver nitrate showed that yielded 89.5% in the same time or less.

It is to be noted in the above examples, the presence of silver nitrate reduced the "induction period" or time to the start of the reaction from 24 or more hours to less than 3, 5 or 7 hours and that, in most cases, about 50% of the monomeric mixture was converted to polymer in 5 to 7 hours. Thus, the total time of reaction in the presence of the silver activator of this invention is much less than in the presence of potassium persulfate alone. Similar results are secured in the polymerization of monomeric mixtures containing vinyl chloride or vinylidene chloride in admixture with one or more of other unsaturated compounds such as vinyl acetate, vinyl propionate, vinyl benzoate, methyl acrylate, methyl methacrylate, and others.

In conjunction with the silver activator of this invention ammonia ($NH_3$) may be used to form a silver-ammonia complex which is exceedingly effective in polymerization. This latter combination is more fully disclosed in my copending application Serial No. 779,412, filed Oct. 11, 1947, now U. S. Patent 2,473,548. A soluble oxalate such as sodium oxalate or ammonium oxalate may also be used with silver ion in polymerization with beneficial results as is more fully disclosed in my copending application Serial No. 779,413, filed Oct. 11, 1947, now U. S. Patent 2,473,549.

While there has been disclosed with considerable detail certain preferred manners of performing this invention, it is not intended or desired to be solely limited thereto, for, as hitherto stated, the procedure may be modified, the precise proportions of the materials utilized may be varied, and other materials having equivalent properties may be employed, if desired, without departing from the spirit and scope of the invention as defined in the appended claims.

I claim:

1. The method which comprises preparing an aqueous emulsion containing a monomeric mixture of vinyl chloride and an alkyl acrylate, water, an emulsifying agent and a combination of polymerization promoting materials consisting solely of from 0.10 to 1.0% by weight on said monomeric mixture of a peroxygen compound and from 0.0005 to 0.50% by weight on said monomeric mixture of a compound ionizable in an aqueous medium to yield $Ag^+$ ion, and carrying out the polymerization of said monomeric mixture in the emulsion in the substantially complete absence of gaseous oxygen.

2. The method of claim 1 wherein the peroxygen compound is potassium persulfate and the compound ionizable to yield $Ag^+$ ion is silver nitrate.

3. The method of claim 2 further characterized in that the alkyl acrylate is ethyl acrylate.

GRANT W. SMITH.

REFERENCES CITED

The following references are of record in the file of this patent:

UNITED STATES PATENTS

| Number | Name | Date |
| --- | --- | --- |
| 1,896,493 | Meis et al. | Feb. 7, 1933 |
| 1,935,733 | Tschunkur et al. | Nov. 21, 1933 |
| 2,113,584 | Fitch et al. | Apr. 12, 1938 |
| 2,380,476 | Stewart | July 31, 1945 |
| 2,417,034 | Youker | Mar. 4, 1947 |
| 2,419,090 | Rainard | Apr. 15, 1947 |